Patented Dec. 15, 1953

2,662,867

UNITED STATES PATENT OFFICE 2,662,867

METHOD OF STABILIZING AQUEOUS DISPERSIONS OF HALOETHYLENE POLYMERS

Joseph Bruce Hoertz, Cuyahoga Falls, Ohio, assignor to The B. F. Goodrich Company, New York, N. Y., a corporation of New York No Drawing. Application March 29, 1951, Serial No. 218,259

6 Claims. (Cl. 260—29.6)

The present invention relates to the production and utilization of aqueous dispersions of haloethylene polymers and pertains more particularly to a method of stabilizing aqueous polymeric dispersions or latices resulting from the polymerization of monomeric mixtures containing vinyl chloride or vinylidene chloride, against chemical breakdown of the polymer and against coagulation or separation of the dispersed polymer.

Aqueous dispersions of homopolymers and interpolymers of vinyl chloride and vinylidene chloride have been found extremely useful in various coating, impregnating and dipping operations and in the production of unsupported film. These dispersions, however, suffer from the disadvantage that upon aging the polymers decompose by the liberation of hydrochloric acid with the result that the latex pH is lowered often to the point where coagulation or creaming of the latex occurs. The polymer in these dispersions is also of reduced stability and usefulness because the liberation of the hydrochloric acid introduces unsaturation and cross-linking into the polymer. The cross-linking manifests itself in a stiffening or hardening of a film or coating deposited from the dispersion.

Such aqueous dispersons of vinyl chloride or vinylidene chloride polymers have been stabilized against auto-coagulation as a result of the loss of hydrochloric acid by periodic addition of substantial quantities of caustic, ammonia, alkaline buffers, etc. However, the addition of alkaline substances does not inhibit polymer decomposition but rather appears to increase the breakdown rate of the polymers and the increased amount of chloride salts formed eventually results in creaming and coagulation of the latex. Because of polymer decomposition a coating or film made from an alkaline-stabilized vinyl chloride or vinylidene chloride latex frequently has very poor properties. Moreover, the properties of aqueous dispersions so stabilized and of the polymer films and coatings obtained therefrom are unpredictable and vary considerably from one lot of latex to another.

It is the principal object of this invention, therefore, to provide a method of producing a stable aqueous dispersion of a haloethylene polymer, which is resistant to chemical breakdown of the polymer, to lowering of latex pH and to coagulation or separation of latex solids. It is also an object of this invention to provide a method of producing aqueous dispersions of a haloethylene polymer from which films and coatings of superior chemical stability may be made.

Another object of the invention is the elimination of unpredictable variations in latex stability and polymer stability heretofore encountered. Other objects will become apparent in the description of the invention which is to follow.

I have discovered that the stability of aqueous dispersions of haloethylene polymers, particularly those of vinyl chloride and vinylidene chloride polymers, is greatly improved by treating the dispersion or latex by a method comprising the consecutive steps of (1) adding to the latex, preferably as soon as practicable after formation thereof by polymerization, a polymerization terminating agent preferably one of the polyhydroxy phenols such as hydroquinone, (2) removing substantially all of the unreacted monomeric materials, particularly the halogen-containing monomers, and (3) adjusting the hydrogen ion concentration of the resulting treated latex to a pH of 7.0 or less, preferably to a pH in the range of from 2.0 to 7.0 and most preferably from 5.0 to 7.0. By this method the rate of polymer decomposition, as shown by the halide ion content of the latex serum, is greatly reduced. The latex is consequently made stable against coagulation or creaming during storage. The latex polymer likewise is stable making unnecessary the periodic addition of alkaline materials to raise the latex pH. Because the viscosity of the latex remains low in the absence of large amounts of electrolytes, latex compounding is greatly simplified. All three of the consecutive steps of the method are necessary and each contributes to increased stability of the latex, though each step alone, or any two of them, does not effectively stabilize the latex.

The first step of my process, that of the addition of the polymerization terminating agent such as hydroquinone, is preferably performed as soon as practicable after formation of the latex by polymerization in aqueous emulsion, but advantageous results are obtained if added at any time prior to monomer removal. The function of the terminating agent is not fully understood since the compounds added are in themselves not effective as polymeric stabilizers. It is believed that the decomposition of these haloethylene polymers in aqueous dispersion proceeds by the attack of free radicals on the polymer chains with the evolution of the hydrohalogen acid. The free radicals responsible for decomposition may arise from residual catalyst, from active polymer chains of short length and from reaction between unreacted monomer and residual catalyst. The addition of the terminating agent is believed to stabilize the polymer not by reacting with the liberated hydrohalogen acid but rather by destroying the free radicals in the dispersion before polymer decomposition is inaugurated.

Any of the polymerization terminating agents of the class consisting of phenols, quinones and nitro-aromatic compounds may be utilized in the first step of the process. Compounds of this class have the ability to terminate the polymerization reaction without catalyzing the liberation of hydrohalogen acid from the haloethylene polymers. Typical terminating agents within this class are the water-soluble phenols such as phenol, hydroquinone, catechol, resorcinol, pyrogallol, phloroglucinol, 1,2,4-trihydroxy benzene, di-tertiary-butyl hydroquinone, di-tertiary-amyl-hydroquinone, tertiary-butyl catechol, 1,2,3,5-tetrahydroxy benzene, hexahydroxy benzene, 1,2-dihydroxy naphthalene (1,2-naphthohydroquinone), 1,4-dihydroxy naphthalene, 1,6-dihydroxy naphthalene, and others; quinone and quinone-type compounds such as tetrahydroquinone, tetrahydroxyquinone, 2,6-dichloro quinone, trichloroquinone, 2-methyl benzoquinone, 2,3-dimethyl quinone, 2,5-dihydroxy quinone, 2,5-dihydroxy-3,6-dinitroquinone, toluquinone, alphanaphthoquinone, beta - naphthoquinone, amphi - naphthoquinone, anthraquinone and others; and the nitro-substituted aromatic compounds such as 1,2-dinitrobenzene, 1,3-dinitrobenzene, 1-chloro-2-nitrobenzene, 1-ethyl-2-nitrobenzene, 1-chloro-2,4-dinitrobenzene, 1-chloro-3,5-dinitrobenzene, 2-chloro-1,3-dinitrobenzene, 3-chloro-1,2-dinitrobenzene, 1-chloro-2,4,5-trinitrobenzene, p-nitrobenzaldehyde, 1,3-dinitronaphthalene, 2-chloro-1,3 - dinitronaphthalene, 1 - hydroxy-2,4-dinitronaphthalene, and others.

Particularly preferred terminating agents are the water-soluble class of aromatic compounds consisting of the polyhydroxy phenols and the quinone-type compounds. The polyhydroxy phenols are believed to function in the termination of polymerization reactions by being converted to the corresponding quinone-type compound. Of these compounds quinone and hydroquinone are most efficient as destroyers of free radicals in aqueous haloethylene polymer dispersions and are inexpensive and readily available.

Only very small quantities of the water-soluble polymerization terminating agent need be utilized. For example, as little as 0.05 to 0.10% by weight of hydroquinone based on the weight of latex (0.1 to 0.5% by weight on polymer solids content) will efficiently stabilize a latex of a polymer of vinylidene chloride and vinyl chloride. In general amounts from 0.01 to 0.50% by weight on the latex (0.04 to 1.00% by weight on polymer) of a terminating agent will be found sufficient to stabilize a latex of a haloethylene polymer providing the residual monomeric materials are removed and the pH of the latex is adjusted in the range of 2.0 to 7.0.

The addition of the polymerization terminating agent is not by itself sufficient to stabilize the polymer in the dispersion. The second step of the process, that of removal of unreacted monomers, particularly of an unreacted haloethylene such as vinyl chloride or vinylidene chloride, is equally important. Since the vinyl resin latices conventionally are made by reaction to substantial completion (i. e. 90 to 95% of monomers reacted) it has not been the practice and it was thought not feasible economically to subject these latices to stripping by vacuum distillation to remove the very small amounts of unreacted monomers dissolved in the aqueous phase or in the polymer. I have discovered, however, that the presence of only very small amounts of unreacted monomer greatly accelerates the rate of decomposition of the polymer. It is believed that the unreacted monomer gives rise to free radicals either directly or by reaction with dissolved oxygen or residual catalyst or by polymerization to short chain lengths which have the power of catalyzing the liberation of hydrohalogen acids. This practice of polymerizing to substantial completion without removal of the variable small quantities of unreacted monomer is believed responsible for the sometimes unpredictable stability of latices of vinyl chloride and vinylidene chloride polymers. The removal of unreacted monomer is accomplished in many ways such as by forcing the polymerization to proceed to absolute completion or by adding a small amount of a volatile extremely reactive monomer to "use up" the residual amounts of less reactive, less volatile monomers after which the excess of volatile monomer is easily removed by distillation. In most instances, however, a more efficient and preferred method is to remove the unreacted monomer by distillation and preferably by steam stripping under vacuum.

The steps of adding the polymerization terminator and removal of unreacted monomers are not sufficient, singly or in combination, to accomplish stabilization of the aqueous polymeric dispersions. Since the polymerization of vinyl-type monomers progresses most satisfactorily in alkaline aqueous mediums containing ammonia, alkali, and other substances such as catalysts, buffers, etc. having an alkaline reaction in aqueous emulsion, the finished aqueous dispersion will contain quantities of these substances sufficient to catalyze decomposition of the polymer. A latex of a vinyl chloride, and especially of a vinylidene chloride polymer, even though treated with a polymerization terminator and freed of residual monomer will decompose at a greatly accelerated rate in the presence of strongly basic materials. For these reasons, it is necessary to adjust the pH of the finished latex at 7 or less, preferably at a pH in the range of 2 to 7 and most preferably in the range of from 5 to 7. The pH is adjusted at 7 or below in various ways. It is best to prepare the aqueous dispersion by polymerizing the monomers in the absence of alkaline materials or in the presence of such small amounts as to produce a latex pH of 7 or less directly. Should the use of alkaline materials be necessary, however, the pH of the dispersion may be controlled by the addition of suitable amounts of acids or acidic buffers such as lead acetate, monosodium phosphate, acetic acid, hydrochloric acid and other acidic substances. Aqueous vinyl or vinylidene chloride polymer dispersons treated according to the three described steps are stable many times longer than highly alkaline latices containing residual monomer and no polymerization terminating agent.

The method of this invention is applicable to the stabilization of aqueous dispersions of any haloethylene polymer, that is, any polymer of a monoolefinic monomer containing labile halogen atoms and thus susceptible to free radical attack in aqueous dispersion with the liberation of a hydrohalogen acid. Typical examples of haloethylene polymers which in aqueous dispersion are susceptible of improvement by this method include the polymers of the vinyl halides such as vinyl chloride, vinyl bromide, vinyl fluoride and the like, vinylidene chloride, vinylidene chlorobromide, vinylidene chlorofluoride, vinylidene fluoride, ethylene tetrafluoride, trichloroethylene and others and halogenated ethylene polymers.

The method of this invention is particularly effective in the production of a stable aqueous dispersion of a polymer produced by polymerization in aqueous emulsion of a chloroethylene containing from one to two chlorine atoms on one only of the carbon atoms and having only hydrogen atoms on the remaining valences of the ethylenic carbon atoms, that is, vinyl chloride or vinylidene chloride, mixtures of these, or mixtures of one or both with one or more other unsaturated monomeric materials. Illustrative examples of monomers preferred for polymerization in aqueous emulsion with vinyl chloride and/or vinylidene chloride in the production of polymeric latices are the unsaturated materials containing the $CH_2=C<$ group, that is, vinylidene compounds such as the alkyl acrylates including methyl, ethyl, propyl, butyl, and octyl acrylates and others, styrene, p-chlorostyrene, 3,5-dichlorostyrene, p-methoxy styrene, acrylonitrile, methacrylonitrile, alpha-chloro acrylonitrile, vinyl bromide, vinyl fluoride, vinyl acetate, vinyl propionate, vinyl butyrate, vinyl benzoate, vinylidene bromide, vinylidene chlorofluoride, methyl methacrylate, butyl ethacrylate, acrylamide, methacrylamide, vinyl methyl ketone, vinyl methyl ether, vinyl pyridine, vinyl carbazole, isobutylene, ethylene and other similar monoolefinic polymerizable compounds. In addition, the preferred chloroethylenes may be polymerized with one or more of the above-mentioned compounds and/or with still other unsaturated polymerizable materials such as diethyl maleate, diethyl fumarate, maleic acid or anhydride or the like.

Best results are obtained by the practice of the method of this invention on aqueous polymeric dispersions resulting from the polymerization in aqueous emulsion of monomeric mixtures predominating in a chloroethylene, that is, vinyl chloride and/or vinylidene chloride, and in particular of monomeric mixtures comprising from 75 to 90% by weight of vinylidene chloride, from 5 to 15% vinyl chloride and from 5 to 15% of an alkyl acrylate.

The following specific examples which describe the invention in greater detail are intended merely as illustrations of the nature of my invention and not as limitations on the scope thereof.

*Example 1*

A tripolymer latex is produced by the polymerization at 50° C. of the monomeric materials contained in a reaction mixture of the following composition:

| Material | Parts/wt. |
|---|---|
| Vinylidene chloride | 77.0 |
| Vinyl chloride | 11.5 |
| Methyl acrylate | 11.5 |
| Emulsifier #1 * | 4.0 |
| Emulsifier #2 ** | 0.5 |
| Potassium persulfate | 0.5 |
| Water | 150.0 |

\* A sodium alkylaryl sulfonate known as "Nacconol NRSF."
\*\* Sodium salt of polymerized alkyl naphthalene sulfonic acids known as "Daxad" #11.

The mixture is agitated at 50° C. for 25 to 30 hours or more in which time the pressure in the reaction vessel drops to zero or below. The latex is "weathered" by exposure to the atmosphere while still at a temperature of 40 to 50° C. The latter procedure is sufficient to remove the last traces of monomeric vinyl chloride or vinylidene chloride and no trace of monomeric methyl acrylate is found in the latex. The final pH of the latex is approximately 6.0. To separate samples of the resulting latex there are added 0.10 part by weight for every 51 parts of latex (0.5% by weight on polymer) of various polyhydroxybenzene compounds. The latex samples without further treatment are aged in stoppered glass containers for 48 hours at 50° C. at which time they are found to have a pH of from 2.5 to 5.5. They are then coagulated by freezing and chloride ion content of the clear latex serum determined. The following results are obtained:

| Material | A | B | C | D | E |
|---|---|---|---|---|---|
| Latex, parts/wt | 51 | 51 | 51 | 51 | 51 |
| Hydroquinone, parts/wt | | 0.1 | | | |
| Catechol | | | 0.1 | | |
| Tert.-butyl catechol | | | | 0.1 | |
| Di-tert.-butyl-hydroquinone | | | | | 0.1 |
| Cl equiv. $\times 10^5$/g. serum | 3.53 | 2.54 | 2.85 | 3.10 | 3.27 |

In a similar fashion the chloride ion content of the serum of a similar latex sample to which were added 0.1 part of quinone was $2.85 \times 10^5$/g.

The effect of further extended aging at 50° C. of samples of the above latex containing 0.5 part by weight on the polymer of hydroquinone is shown below:

| | F | G | H | I | J | K |
|---|---|---|---|---|---|---|
| Latex | 51 | 51 | 51 | 51 | 51 | 51 |
| Hydroquinone | | | | 0.5 | 0.5 | 0.5 |
| Hours at 50° C | 48 | 96 | 144 | 48 | 96 | 144 |
| Cl- equiv. $\times 10^5$/g. serum | 3.64 | 4.06 | 4.71 | 3.07 | 3.36 | 3.61 |

It is seen therefore that the various polymerization terminating agents and hydroquinone in particular greatly reduces the rate of decomposition of the polymer. After 144 hours aging the rate of change of chlorine loss (as hydrochloric acid) was less with hydroquinone than without. Further increases in the amount of hydroquinone reduces the rate of decomposition as is shown by a sample of the above latex containing 0.75 part of hydroquinone on the polymer after aging for 48 hours having a chlorine ion equivalent of 3.02 as compared to 3.67 for a sample without hydroquinone.

*Example 2*

To demonstrate the effect of residual monomer upon the rate of decomposition of the polymer in the latex of Example 1, the monomer free latex which has an original pH of 6.0 is treated with small amounts of monomeric vinyl chloride or vinylidene chloride both in the presence and absence of a polymerization terminator such as hydroquinone. The latex samples are then heat aged for 48 hours at 50° C. and the following results obtained:

| Vinyl chloride, ml./100 | Vinylidene chloride, ml./100 | Hydroquinone, pts./100 | Cl- equiv. $\times 10^5$/g. serum |
|---|---|---|---|
| 0 | 0 | 0 | 3.67 |
| 0 | 0 | 0.5 | 3.19 |
| 2.5 | 0 | 0 | 4.09 |
| 2.5 | 0 | 0.5 | 3.89 |
| 0 | 2.5 | 0 | 4.34 |
| 0 | 2.5 | 0.5 | 3.44 |

From the above data it is readily seen that the presence of amounts of monomeric vinyl chloride or vinylidene chloride as small as 2.5 ml.

per 100 parts of the original monomers (essentially 2.5 ml. per 100 parts of polymer in the latex) results in an increase of chloride ion of about 22% even though 0.5 part of hydroquinone per 100 parts of polymer are present. Thus the three steps of adding the polymerization terminator, removing monomers and adjusting the pH at 7 or below are necessary to the stability of the polymer in the dispersion. Shelf aging of samples of latex treated by the three steps of the process for 2 to 4 months does not result in coagulation or substantial impairment of polymer properties.

*Example 3*

To demonstrate the effect of pH on the rate of decomposition of the polymer of the latex of Example 1, 0.5 part of sodium bicarbonate per 100 parts of polymer in the latex is added. After heat aging for 48 hours at 50° C. the chloride ion equivalent per gram of latex serum is 5.11 and the latex pH is 7.28 (as compared to a chloride ion equivalent of 3.67 for the untreated latex having a pH of 5.12). Further increases in the amount of alakine reagents so as to raise the latex pH to 8.0 to 9.5 greatly accelerates the decomposition of the polymer. The acceleration of decomposition under alkaline conditions is so great that to store the latex for several months periodic additions of ammonia or alkali are necessary in which case a point is eventually reached where the viscosity of the latex becomes so great as to make it useless in certain dipping and impregnating operations. The treated latices demonstrated in the examples, however, remain fluid for long periods of time. Thus, all three steps of the process of this invention are seen to be necessary to the stabilization of a vinylidene chloride vinyl chloride latex.

*Example 4*

Similar results are obtained by applying the process of the invention to aqueous polymeric dispersions of the following polymers: polyvinyl chloride; copolymers of 80 to 95% by weight of vinyl chloride or vinylidene chloride and 5 to 20% of methyl acrylate, ethyl acrylate, or vinyl acetate; copolymers of 65 to 85% vinylidene chloride and 15 to 35% acrylonitrile; copolymers of 80 to 95% vinyl chloride or vinylidene chloride and 5 to 20% trichloroethylene; and tripolymers of 50 to 90% vinyl chloride, 5 to 40% of an alkyl acrylate, and 5 to 40% of vinyl benzoate. In each case the rate of decomposition of the dispersed polymer is greatly reduced and the stability of the dispersion improved by the treatment of this invention.

Aqueous polymeric dispersions treated according to this invention may be made alkaline, if desired, just before use so as to facilitate the incorporation of certain compounding ingredients and to facilitate coating, impregnating, and dipping operations and to prevent deleterious acid corrosion of equipment. Any of the conventional latex compounding ingredients such as thickeners, color pigments, plasticizers, fillers, light stabilizers and others may be incorporated before use as is well understood in the art.

While I have disclosed with considerable detail certain preferred manners of performing the invention, I do not thereby desire or intend to limit myself solely thereto, for the precise proportions of the materials utilized may be varied and equivalent chemical materials may be employed, if desired, without departing from the spirit and scope of the invention as defined in the appended claims.

I claim:

1. The method of stabilizing an aqueous dispersion of a haloethylene polymer which comprises adding to said dispersion a polymerization terminator selected from the class consisting of phenols, quinones and nitro-aromatic compounds, removing substantially all of the residual monomeric material, and maintaining the pH of the dispersion in the range of 2.0 to 7.0.

2. The method of stabilizing an aqueous polymeric dispersion of a haloethylene containing from 1 to 2 halogen atoms on one only of the carbon atoms and having only hydrogen atoms on the remaining valences of the ethylenic carbon atoms which comprises adding to said dispersion a polymerization terminator selected from the class consisting of phenols, quinones and nitro-aromatic compounds, removing substantially all of the residual monomeric material, and adjusting the pH of the dispersion in the range of 5.0 to 7.0.

3. The method of stabilizing an aqueous polymeric dispersion resulting from the polymerization in aqueous emulsion of a monoolefinic monomeric mixture comprising predominantly a chloroethylene containing from 1 to 2 chlorine atoms on one only of the carbon atoms and having only hydrogen atoms on the remaining valences of the ethylenic carbon atoms which comprises adding to said dispersion a water-soluble quinone, removing substantially all of the residual monomeric chloroethylene and adjusting the pH of the dispersion in the range of 5.0 to 7.0.

4. The method of stabilizing an aqueous polymeric dispersion resulting from the polymerization in aqueous emulsion of a monomeric mixture comprising predominantly vinyl chloride which comprises adding to said dispersion a water-soluble polyhydroxy phenol, removing substantially all of the residual monomeric vinyl chloride from the dispersion, and adjusting the hydrogen ion concentration of the dispersion in the range of 5.0 to 7.0.

5. The method of stabilizing an aqueous polymeric dispersion resulting from the polymerization in aqueous emulsion of a monomeric mixture comprising predominantly vinylidene chloride which comprises adding to said dispersion a water-soluble polyhydroxy phenol, removing substantially all of the residual monomeric vinylidene chloride from the dispersion, and adjusting the hydrogen ion concentration of the dispersion in the range of 5.0 to 7.0.

6. The method of stabilizing an aqueous polymeric dispersion resulting from the polymerization in aqueous emulsion of a monomeric mixture comprising from 75 to 90% vinylidene chloride, from 5 to 15% by weight of vinyl chloride and from 5 to 15% by weight of an alkyl acrylate which comprises adding hydroquinone to said emulsion, removing substantially all of the residual monomeric vinyl chloride and vinylidene chloride, and adjusting the hydrogen ion concentration of the dispersion in the range of 5.0 to 7.0.

JOSEPH BRUCE HOERTZ.

References Cited in the file of this patent

UNITED STATES PATENTS

| Number | Name | Date |
| --- | --- | --- |
| 2,519,135 | Jacobson | Aug. 15, 1950 |

FOREIGN PATENTS

| Number | Country | Date |
| --- | --- | --- |
| 605,517 | Great Britain | July 26, 1948 |